(12) United States Patent
Ossig et al.

(10) Patent No.: US 8,625,106 B2
(45) Date of Patent: Jan. 7, 2014

(54) METHOD FOR OPTICALLY SCANNING AND MEASURING AN OBJECT

(75) Inventors: Martin Ossig, Tamm (DE); Philipp Schumann, Stuttgart (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/384,795

(22) PCT Filed: Jul. 20, 2010

(86) PCT No.: PCT/IB2010/002216
§ 371 (c)(1),
(2), (4) Date: Feb. 16, 2012

(87) PCT Pub. No.: WO2011/010225
PCT Pub. Date: Jan. 27, 2011

(65) Prior Publication Data
US 2012/0133953 A1 May 31, 2012

Related U.S. Application Data

(60) Provisional application No. 61/299,126, filed on Jan. 28, 2010.

(30) Foreign Application Priority Data

Jul. 22, 2009 (DE) .......................... 10 2009 035 337

(51) Int. Cl.
*G01B 11/24* (2006.01)
(52) U.S. Cl.
USPC ........................................................ 356/601

(58) Field of Classification Search
USPC ........................................................ 356/601
See application file for complete search history.

(56) References Cited

U.S. PATENT DOCUMENTS

| 3,830,567 A | 8/1974 | Riegl |
| 3,899,145 A | 8/1975 | Stephenson |

(Continued)

FOREIGN PATENT DOCUMENTS

| AT | 508635 A1 | 3/2011 |
| AU | 2005200937 A1 | 9/2006 |

(Continued)

OTHER PUBLICATIONS

Akca, Devrim, Full Automated Registration of Laser Scanner Point Clouds, Institute of Geodesy and Photogrammetry, Swiss Federal Institute of Technology, Zuerich, Switzerland; Published Dec. 2003.

(Continued)

*Primary Examiner* — Tu Nguyen
(74) *Attorney, Agent, or Firm* — Cantor Colburn LLP

(57) ABSTRACT

In a method for optically scanning and measuring an object by a laser scanner by a procedure in which a emission light beam modulated with a target frequency is emitted by means of a light emitter, a reception light beam reflected or otherwise scattered in some way from an object in the surroundings of the laser scanner is received, with a measuring clock, as a multiplicity of samples by means of a light receiver and in each case at least the distance from the object is determined from the phase angles of the multiplicity of samples for a plurality of measuring points by means of a control and evaluation device, for determining the distances, a phase shift caused by a distance difference of temporal adjacent samples is corrected in order to correct the distances.

7 Claims, 2 Drawing Sheets

(56) References Cited

U.S. PATENT DOCUMENTS

| | | |
|---|---|---|
| 3,945,729 A | 3/1976 | Rosen |
| 4,733,961 A | 3/1988 | Mooney |
| 4,736,218 A | 4/1988 | Kutman |
| 4,984,881 A | 1/1991 | Osada et al. |
| 5,155,684 A | 10/1992 | Burke et al. |
| 5,218,427 A | 6/1993 | Koch |
| 5,313,261 A | 5/1994 | Leatham et al. |
| 5,329,347 A | 7/1994 | Wallace et al. |
| 5,329,467 A | 7/1994 | Nagamune et al. |
| 5,402,365 A | 3/1995 | Kozikaro et al. |
| 5,446,846 A | 8/1995 | Lennartsson |
| 5,517,297 A | 5/1996 | Stenton |
| 5,629,756 A | 5/1997 | Kitajima |
| 5,675,326 A | 10/1997 | Juds et al. |
| 5,734,417 A | 3/1998 | Yamamoto et al. |
| 5,745,225 A | 4/1998 | Watanabe et al. |
| 5,793,993 A | 8/1998 | Broedner et al. |
| 5,894,123 A | 4/1999 | Ohtomo et al. |
| 5,898,490 A | 4/1999 | Ohtomo et al. |
| 5,933,267 A | 8/1999 | Ishizuka |
| 5,936,721 A | 8/1999 | Ohtomo et al. |
| 5,940,181 A | 8/1999 | Tsubono et al. |
| 5,988,862 A | 11/1999 | Kacyra et al. |
| 6,040,898 A | 3/2000 | Mrosik et al. |
| 6,069,700 A | 5/2000 | Rudnick et al. |
| 6,077,306 A | 6/2000 | Metzger et al. |
| 6,149,112 A | 11/2000 | Thieltges |
| 6,349,249 B1 | 2/2002 | Cunningham |
| 6,445,446 B1 | 9/2002 | Kumagai et al. |
| 6,480,270 B1 | 11/2002 | Studnicka et al. |
| 6,483,106 B1 | 11/2002 | Ohtomo et al. |
| 6,504,602 B1 | 1/2003 | Hinderling |
| 6,512,575 B1 | 1/2003 | Marchi |
| 6,650,402 B2 | 11/2003 | Sullivan et al. |
| 6,675,122 B1 | 1/2004 | Markendorf et al. |
| 6,710,859 B2 | 3/2004 | Shirai et al. |
| 6,750,873 B1 | 6/2004 | Bernardini et al. |
| 6,825,923 B2 | 11/2004 | Hamar et al. |
| 6,856,381 B2 | 2/2005 | Christoph |
| 6,917,415 B2 | 7/2005 | Gogolla et al. |
| 6,965,843 B2 | 11/2005 | Raab et al. |
| 7,029,126 B2 | 4/2006 | Tang |
| 7,069,124 B1 | 6/2006 | Whittaker et al. |
| 7,076,420 B1 | 7/2006 | Snyder et al. |
| 7,127,822 B2 | 10/2006 | Kumagai et al. |
| 7,140,213 B2 | 11/2006 | Feucht et al. |
| 7,190,465 B2 | 3/2007 | Froehlich et al. |
| 7,193,690 B2 | 3/2007 | Ossig et al. |
| 7,285,793 B2 | 10/2007 | Husted |
| 7,352,446 B2 | 4/2008 | Bridges et al. |
| 7,430,068 B2 | 9/2008 | Becker et al. |
| 7,541,830 B2 | 6/2009 | Fahrbach et al. |
| 7,659,995 B2 | 2/2010 | Knighton et al. |
| 7,733,544 B2 | 6/2010 | Becker et al. |
| 7,798,453 B2 | 9/2010 | Maningo et al. |
| 7,834,985 B2 * | 11/2010 | Morcom ..................... 356/5.03 |
| 7,847,922 B2 | 12/2010 | Gittinger et al. |
| 7,869,005 B2 | 1/2011 | Ossig et al. |
| 7,935,928 B2 | 5/2011 | Seger et al. |
| 7,994,465 B1 * | 8/2011 | Bamji et al. ............... 250/214 R |
| 7,995,834 B1 | 8/2011 | Knighton et al. |
| 8,020,657 B2 | 9/2011 | Allard et al. |
| 8,117,668 B2 | 2/2012 | Crampton et al. |
| 8,152,071 B2 | 4/2012 | Doherty et al. |
| 8,310,653 B2 | 11/2012 | Ogawa et al. |
| 8,384,914 B2 | 2/2013 | Becker et al. |
| 2002/0059042 A1 | 5/2002 | Kacyra et al. |
| 2002/0143506 A1 | 10/2002 | D'Aligny et al. |
| 2002/0149694 A1 | 10/2002 | Seo |
| 2003/0043386 A1 | 3/2003 | Froehlich et al. |
| 2003/0090646 A1 | 5/2003 | Riegl et al. |
| 2003/0137449 A1 | 7/2003 | Vashisth et al. |
| 2003/0179361 A1 | 9/2003 | Ohtomo et al. |
| 2004/0004727 A1 | 1/2004 | Yanagisawa et al. |
| 2004/0027554 A1 | 2/2004 | Ishinabe et al. |
| 2004/0158355 A1 | 8/2004 | Holmqvist et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2005/0046823 A1 | 3/2005 | Ando et al. |
| 2005/0111514 A1 | 5/2005 | Matsumoto et al. |
| 2005/0141052 A1 | 6/2005 | Becker et al. |
| 2005/0172503 A1 | 8/2005 | Kumagai et al. |
| 2005/0190384 A1 | 9/2005 | Persi et al. |
| 2006/0061566 A1 | 3/2006 | Verma et al. |
| 2006/0088044 A1 | 4/2006 | Hammerl |
| 2006/0109536 A1 | 5/2006 | Mettenleiter et al. |
| 2006/0193521 A1 | 8/2006 | England, III et al. |
| 2006/0241791 A1 | 10/2006 | Pokorny et al. |
| 2007/0058154 A1 | 3/2007 | Reichert et al. |
| 2007/0064976 A1 | 3/2007 | England, III |
| 2007/0100498 A1 | 5/2007 | Matsumoto et al. |
| 2007/0118269 A1 | 5/2007 | Gibson et al. |
| 2007/0122250 A1 | 5/2007 | Mullner |
| 2007/0150111 A1 | 6/2007 | Wu et al. |
| 2007/0171394 A1 | 7/2007 | Steiner et al. |
| 2007/0181685 A1 | 8/2007 | Zhu et al. |
| 2007/0229929 A1 | 10/2007 | Soreide et al. |
| 2008/0052808 A1 | 3/2008 | Leick et al. |
| 2008/0075326 A1 | 3/2008 | Otani et al. |
| 2008/0154538 A1 | 6/2008 | Stathis |
| 2008/0273758 A1 | 11/2008 | Fuchs et al. |
| 2008/0309546 A1 | 12/2008 | Wakayama et al. |
| 2009/0021351 A1 | 1/2009 | Beniyama et al. |
| 2009/0046752 A1 | 2/2009 | Bueche et al. |
| 2009/0051938 A1 | 2/2009 | Miousset et al. |
| 2009/0095047 A1 | 4/2009 | Patel et al. |
| 2009/0100949 A1 | 4/2009 | Shirai et al. |
| 2009/0133494 A1 | 5/2009 | Van Dam et al. |
| 2009/0161091 A1 | 6/2009 | Yamamoto |
| 2009/0323742 A1 | 12/2009 | Kumano |
| 2010/0030421 A1 | 2/2010 | Yoshimura et al. |
| 2010/0049891 A1 | 2/2010 | Hartwich et al. |
| 2010/0195086 A1 | 8/2010 | Ossig et al. |
| 2010/0277472 A1 | 11/2010 | Kaltenbach et al. |
| 2011/0025905 A1 | 2/2011 | Tanaka |
| 2011/0066781 A1 | 3/2011 | Debelak et al. |
| 2012/0035788 A1 | 2/2012 | Trepagnier et al. |
| 2012/0035798 A1 | 2/2012 | Barfoot et al. |
| 2012/0046820 A1 | 2/2012 | Allard et al. |
| 2012/0169876 A1 | 7/2012 | Reichert et al. |

FOREIGN PATENT DOCUMENTS

| | | |
|---|---|---|
| CN | 1735789 | 2/2006 |
| CN | 1838102 A | 9/2006 |
| DE | 2216765 A1 | 4/1972 |
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10137241 A1 | 9/2002 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10361870 A1 | 7/2005 |
| DE | 102004015111 A1 | 10/2005 |
| DE | 102004028090 A1 | 12/2005 |
| DE | 202006005643 U1 | 8/2006 |
| DE | 102005056265 A1 | 5/2007 |
| DE | 102006053611 A1 | 5/2007 |
| DE | 102006024534 A1 | 11/2007 |
| DE | 102007037162 A1 | 2/2009 |

(56) References Cited

FOREIGN PATENT DOCUMENTS

| | | |
|---|---|---|
| DE | 102008014274 A1 | 8/2009 |
| DE | 102009035336 B3 | 11/2010 |
| DE | 102010032725 A1 | 1/2012 |
| EP | 0667549 A2 | 8/1995 |
| EP | 0727642 A1 | 8/1996 |
| EP | 0838696 A1 | 4/1998 |
| EP | 0949524 A1 | 10/1999 |
| EP | 1056987 A1 | 6/2000 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 2336493 A | 10/1999 |
| GB | 2388661 A | 11/2003 |
| GB | 2447258 A | 9/2008 |
| JP | H0357911 A | 3/1991 |
| JP | H0572477 A | 3/1993 |
| JP | 07128051 A | 5/1995 |
| JP | H07229963 A | 8/1995 |
| JP | 0815413 A | 1/1996 |
| JP | 0821714 A | 1/1996 |
| JP | H08129145 A | 5/1996 |
| JP | H08136849 A | 5/1996 |
| JP | H08262140 A | 10/1996 |
| JP | 1123993 A | 1/1999 |
| JP | 2000121724 A | 4/2000 |
| JP | 2000339468 A | 12/2000 |
| JP | 2003050128 A | 2/2003 |
| JP | 2003156330 A | 5/2003 |
| JP | 2003156562 A | 5/2003 |
| JP | 2003202215 A | 7/2003 |
| JP | 2004109106 A | 4/2004 |
| JP | 2004348575 A | 12/2004 |
| JP | 2005055226 A | 3/2005 |
| JP | 2005069700 A | 3/2005 |
| JP | 2005215917 A | 8/2005 |
| JP | 2006038683 A | 2/2006 |
| JP | 2008076303 A | 4/2008 |
| JP | 2008082707 A | 4/2008 |
| JP | 2008096123 A | 4/2008 |
| JP | 2009063339 A | 3/2009 |
| JP | 2009541758 A | 11/2009 |
| WO | 89/05512 | 6/1989 |
| WO | 97/11399 | 3/1997 |
| WO | 0020880 A2 | 4/2000 |
| WO | 0063645 | 10/2000 |
| WO | 0063681 A2 | 10/2000 |
| WO | 02084327 A2 | 10/2002 |
| WO | 2005008271 A2 | 1/2005 |
| WO | 2005059473 A2 | 6/2005 |
| WO | 2006000552 A1 | 1/2006 |
| WO | 2006053837 A1 | 5/2006 |
| WO | 2007012198 A1 | 2/2007 |
| WO | 2007051972 A1 | 5/2007 |
| WO | 2007087198 A1 | 8/2007 |
| WO | 2007118478 A1 | 10/2007 |
| WO | 2008019856 A1 | 2/2008 |
| WO | 2008048424 A2 | 4/2008 |
| WO | 2008068791 A1 | 6/2008 |
| WO | 2009053085 A1 | 4/2009 |
| WO | 2009095384 A2 | 8/2009 |
| WO | 2009123278 A1 | 10/2009 |
| WO | 2010108644 A1 | 9/2010 |
| WO | 2011021103 A1 | 2/2011 |
| WO | 2012013525 A2 | 8/2012 |

OTHER PUBLICATIONS

First Office Action and Search Report with English Translation for Chinese Patent Application No. 201080003456.3; Issue Date Jan. 17, 2013.
Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.
Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.
Chinese Office Action Dated Jun. 2, 2010 with English Translation of the Text for Application No. 2006800540959.
Chinese Publication No. CN 1445509, published Oct. 1, 2003—English Abstract Not Available; EP Equivalent 1347267.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP002587995, Proceedings of the SPIE.
Godin, G., et al., A Method for the Registration of Attributed Range Images, Copyright 2001, [Retrieved on Jan. 18, 2010 at 03:29 from IEEE Xplore].
International Preliminary Report and Written Opinion for International Application No. PCT/EP2007/005789; Date of Mailing oct. 30, 2007.
International Preliminary Report on Patentability and Written Opinion for PCT/IB2010/002216; Date of Issuance Jan. 24, 2012.
International Preliminary Report on Patentability and Written Opinion for PCT/EP2009/050887; Date of Issue Sep. 7, 2010.
International Preliminary Report on Patentability and Written Opinion for PCT/IB2010/002226; Date of Issuance Jan. 24, 2012.
International Preliminary Report on Patentability and Written Opinion for PCT/EP2004/014605; Date of Issue Aug. 29, 2006.
iQsun Laserscanner Brochure, 2 Pages, Apr. 2005.
International Preliminary Report on Patentability and Written Opinion for PCT/EP2009/050888; Date of Issuance Sep. 7, 2010.
International Search Report of the International Searching Authority and Written Opinion for PCT/EP2009/009174; Date of Mailing May 25, 2010.
International Search Report of the International Searching Authority for PCT/EP2010/006867; Date of Mailing Mar. 18, 2011.
International Search Report of the International Searching Authority for PCT/EP2007/005789; Date of Mailing Oct. 30, 2007.
International Search Report of the International Searching Authority for PCT/IB2010/002226; Date of Mailing Dec. 13, 2010.
International Search Report for of the International Searching Authority for PCT/EP2004/014605; Date of Mailing Apr. 15, 2005.
International Search Report of the International Searching Authority for PCT/EP2006/003010; Date of Mailing Nov. 12, 2006.
International Search Report of the International Searching Authority for PCT/EP2010/001779; Date of Mailing Jul. 20, 2010.
International Search Report of the International Searching Authority for PCT/EP2010/001780; Date of Mailing Jul. 23, 2010.
International Search Report of the International Searching Authority for PCT/EP2010/001781; Date of Mailing Jul. 22, 2010.
International Search Report of the International Searching Authority for PCT/IB2010/002258; Date of Mailing Jan. 28, 2011.
International Search Report of the International Searching Authority for PCT/EP2009/050888; Date of Mailing Sep. 15, 2009.
International Search Report of the International Searching Authority for PCT/EP2010/006866; Date of Mailing Mar. 14, 2011.
International Search Report of the International Searching Authority for PCT/EP2010/006868; Date of Mailing Mar. 14, 2011.
International Search Report of the International Searching Authority for PCT/EP2009/050887; Date of Mailing May 14, 2009.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/servlet/GetPDFServlet?filetype=pdf&id=PSISDG00205900000100031600001

(56) References Cited

OTHER PUBLICATIONS

&idtype=cvips&doi=10.117/12.150236&prog=normal>[retrieved on Mar. 8, 2011] the whole document.
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].
Williams, J.A., et al., Evaluation of a Novel Multiple Point Set Registration Algorithm, Copyright 2000, [Retrieved on Jan. 18, 2010 at 04:10 from IEEE Xplore].
Written Opinion of the International Searching Authority for International Patent Application PCT/EP2010/006867; Date of Mailing Mar. 18, 2011.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/ROBOT.2001.932908 ISBN: 978-0-7803-6576-6, the whole document.
International Search Report of the International Searching Authority for Application No. PCT/EP2011/003261; Date of Mailing Oct. 17, 2011.
International Search Report of the International Searching Authority for Application No. PCT/EP2011/003263; Date of Mailing Oct. 19, 2011.
International Search Report of the International Searching Authority for Application No. PCT/EP2011/003264; Date of Mailing Oct. 19, 2011.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.
International Search Report of the International Searching Authority for Application No. PCT/EP2011/001662; Date of Mailing May 26, 2011.
Written Opinion of the International Searching Authority for Application No. PCT/EP2011/001662; Date of Mailing May 26, 2011.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
Ingensand, H., Dr., "Introduction to Geodetic Metrology", "Einfuhrung in die Geodatische Messtechnik", Federal Institute of Technology Zurich, Edition 2004, p. 16.
FARO Laserscanner LS, Presentation Forensic Package, Policeschool of Hessen, Wiesbaden, Germany, Dec. 14, 2005; FARO Technologies, Copyright 2008.
FARO Laser Scanner LS, Recording Reality's Digital Fingerprint, The Measure of Success, Copyright 2005.
Leica Geosystems, FBI Crime Scene Case Study.
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.
Howard, et al., "Virtual Environments for Scene of Crime Reconstruction and Analysis", Advanced Interfaces Group, Department of Computer Science, University of Manchester, Manchester, UK, Feb. 28, 2000.
International Preliminary Report on Patentability and Written Opinion for PCT/EP2010/001779; Date of Issuance Sep. 27, 2011.
International Preliminary Report on Patentability and Written Opinion for PCT/IB2010/002258; Date of Issuance Feb. 21, 2012.
International Preliminary Report on Patentability and Written Opinion for PCT/EP2010/006866; Date of Issuance May 22, 2012.
International Preliminary Report on Patentability and Written Opinion for PCT/EP2010/006867; Date of Issuance May 22, 2012.
International Preliminary Report on Patentability and Written Opinion for PCT/EP2010/001780; Date of Issuance Sep. 27, 2011.
International Preliminary Report on Patentability and Written Opinion for PCT/EP2010/001781; Date of Issuance Sep. 27, 2011.
International Preliminary Report on Patentability and Written Opinion for PCT/EP2010/006868; Date of Issuance May 22, 2012.
International Preliminary Report on Patentability and Written Opinion for PCT/EP2009/009174; Date of Issuance Aug. 16, 2011.
Leica Geosystems TruStory Forensic Analysis by Albuquerque Police Department, 2006.
Langford, et al., "Practical Skills in Forensic Science", Pearson Education Limited, Essex, England, First Published 2005, Forensic Chemistry.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
Se, et al., "Instant Scene Modeler for Crime Scene Reconstruction", MDA, Space Missions, Ontario, Canada, Copyright 2005, IEEE.
The Scene, Journal of The Association for Crime Scene Reconstruction, Apr.-Jun. 2006, vol. 12, Issue 2.
Written Opinion of the International Searching Authority for Application No. PCT/EP2006/003010; Date of Mailing Dec. 11, 2006.
Chinese Notification of First Office Action for Chinese Application No. 201080003463.3; Issued Oct. 30, 2012 (translated).
International Preliminary Report on Patentability for International Application Serial No. PCT/EP2011/003261. International filed Jul. 1, 2011. Date of Issuance Jan. 29, 2013.
International Preliminary Report on Patentability for International Application Serial No. PCT/EP2011/003262. International filed Jul. 1, 2011. Date of Issuance Jan. 29, 2013.
International Preliminary Report on Patentability for International Application Serial No. PCT/EP2011/003263. International filed Jul. 1, 2011. Date of Issuance Jan. 29, 2013.
International Preliminary Report on Patentability for International Application Serial No. PCT/EP2011/003264. International filed Jul. 1, 2011. Date of Issuance Jan. 29, 2013.
WO 00/26612 is the published equivalent of DE 19850118. Published May 11, 2000.
US 20100134596 A1 is the equivalent to DE 20 2006005643U1. Published Jun. 3, 2010.
International Search Report of the International Searching Authority for PCT/IB2010/002216; date of mailing Feb. 3, 2011.
Merriam-Webster (m-w.com), "Interface". 2012. http://www.merriam-webstercom/clictionary/interface.
Merriam-Webster (m-w.com), "Traverse". 2012. http://www.merriam-webster.com/dictionary/traverse.
Merriam-Webster (m-w.com), "Parts". 2012. http://www.merriam-webstercom/dictionary/parts.
First Chinese Office Action for Application No. 201080003467.1; Office Action Issue Date Feb. 5, 2013; (translated).
Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on-line], Downloaded From: http://proceedings.spiedigitallibrary.org/on Jan. 26, 2013.
"Scanner Basis Configuration for Riegl VQ-250", Riegl Company Webpage, Feb. 16, 2011, XP002693900, Retrieved from the internet: URL:http://www.riegl.com/uploads/tx_pxpriegldownloads/30_SystemConfiguration_VQ-250_02-11_16-02-11.pdf [retrieved on Mar. 15, 2013]the whole document.
PCT/EP2012/075178.
GB Examination Report dated Mar. 27, 2013 for GB Application No. GB1303390.7.
GB Examination Report dated Mar. 27, 2013 for GB Application No. GB1303382.4.
Chinese Office Action for Chinese Application Serial No. 201080047516-1; Date of Issue Apr. 1, 2013.
Germany Office Action for DE Application No. 10 2012 107 544.1; Issued Jan. 2, 2013.
International Search Report of the International Searching Authority for Application No. PCT/EP2012/075178; Date of Mailing Apr. 9, 2013.

(56) References Cited

OTHER PUBLICATIONS

International Search Report of the International Searching Authority for Application No. PCT/EP2011/003262; Date of Mailing Sep. 30, 2011.
Written Opinion of the International Searching Authority for Application No. PCT/EP2012/075178; Date of Mailing Apr. 9, 2013.
Leica Geosystems, FBI Crime Scene Case Study, Cited in Opposition of EP Application No. 07785873.6 in Oral Proceedings held on Jun. 27, 2013, Munchen, Germany; D13, p. 5 of Summons, Tony Grissim, Feb. 2006.
Second Office Action with English Translation for Chinese Patent Application No. 201080003466.7; Issue Date Jul. 19, 2013.
German Office Action for DE Application Serial No. 102012109481.0; dated Aug. 1, 2013.
Japanese Office Action for JP Application Serial No. 2013-520990; Date of Mailing Jul. 2, 2013.
GB Examination Report dated Jun. 19, 2013 for GB Application No. GB1202398.2.
GB Examination Report dated Aug. 15, 2013 for GB Application No. GB 1303382.4.
GB Examination Report dated Aug. 7, 2013 for GB Application No. GB1303390.7.
Japanese Office Action for JP Application No. 2012-534589; issued Jul. 30, 2013.
Japanese Office Action for JP Application Serial No. 2012-501175; Date of Mailing Jul. 16, 2013.
Japanese Office Action for Application Serial No. 2013-520987; Date of Mailing Jul. 2, 2013.
Japanese Office Action for Application Serial No. 2013-520989; Date of Mailing Jul. 2, 2013.
Japanese Office Action for Application Serial No. 2012-534590; Date of Mailing Jul. 30, 2013.
First Chinese Office Action for Chinese Patent Applicaiton No. 2013082200801190; Dated Aug. 27, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.

* cited by examiner

METHOD FOR OPTICALLY SCANNING AND MEASURING AN OBJECT

CROSS REFERENCE TO RELATED APPLICATIONS

The present application is a National Stage Application of PCT Application No. PCT/IB2010/002216 filed on Jul. 20, 2010, which claims the benefit of U.S. Provisional Patent Application No. 61/299,126 filed on Jan. 28, 2010, and of German Patent Application No. DE 10 2009 035 337.2, filed on Jul. 22, 2009, now abandoned, and which are hereby incorporated by reference.

BACKGROUND OF THE INVENTION

The invention relates to a method for optically scanning and measuring an object.

By means of a laser scanner such as is known from U.S. Pat. No. 7,430,068 for example, the surroundings of the laser scanner can be optically scanned and measured. One known method for this, called "zero cross", determines the zero crossings of modulation of the emission light beam and of the reception light beam. The temporal difference corresponds to the distance. Only a small number of locations are thus evaluated, namely the zero crossings.

SUMMARY OF THE INVENTION

Embodiments of the present invention are based on the object of improving a method of the type mentioned hereinabove.

The method according to embodiments of the present invention makes it possible firstly to carry out the scanning without correction and then to correct the samples by the correction of the phase shift. The phase shift, which can be regarded as a distortion of the time or frequency domain, fluctuates over the phase angle corresponding to the distance. A virtual speed can be determined for the correction of the phase shift, the virtual speed supplying the approximated phase shift. An iterative determination of the virtual speed may be carried out. Instead of individual locations, the time signal can be utilized in its entirety. The phase shift can be substantially corrected in practice. The correction is effected on line before the samples are combined, with data reduction, to form the measuring points.

BRIEF DESCRIPTION OF THE DRAWINGS

The invention is explained in more detail below on the basis of exemplary embodiments illustrated in the drawings, in which.

DETAILED DESCRIPTION OF THE INVENTION

Figure 1:
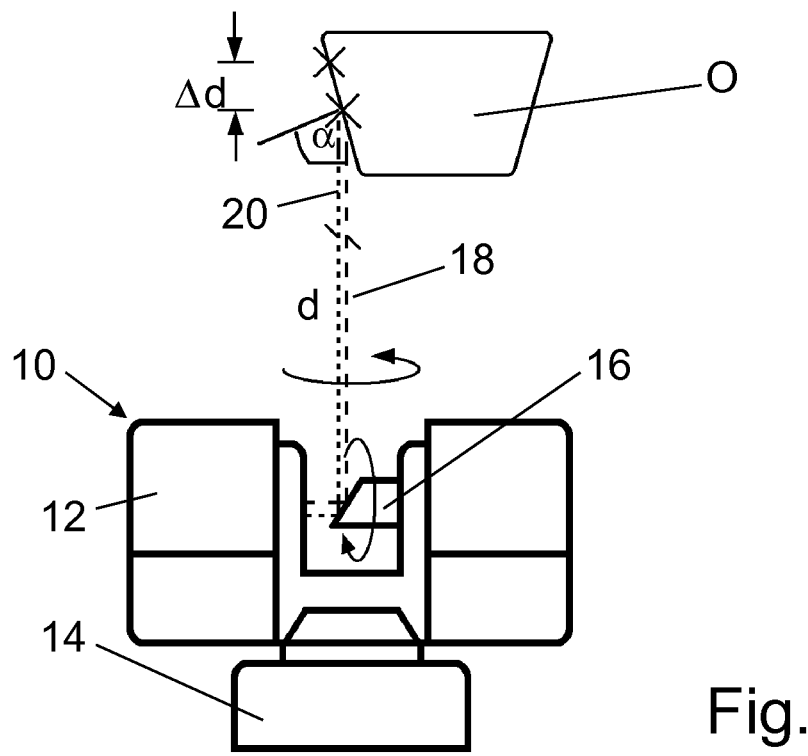
FIG. 1 is a schematic illustration of a laser scanner with an object located in the surroundings of the laser scanner.
Figure 2:
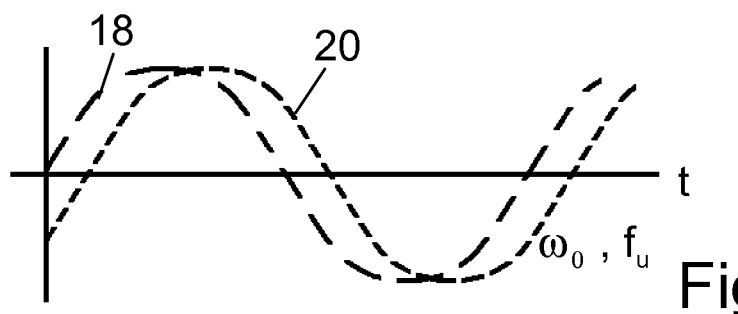
FIG. 2 is a schematic illustration of the time signal.
Figure 3:
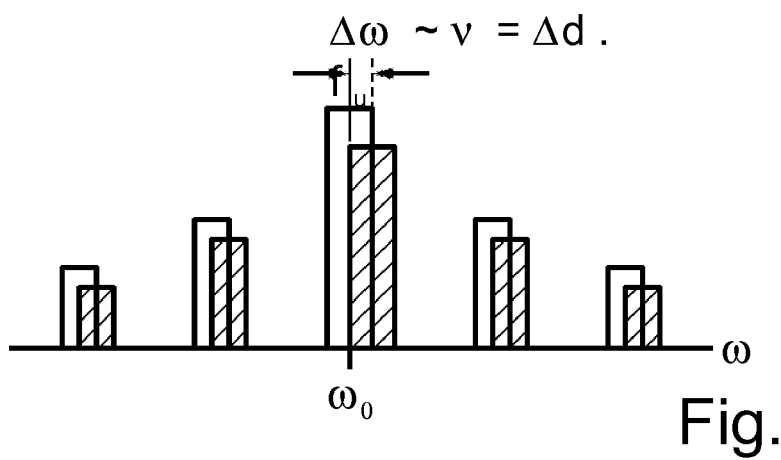
FIG. 3 is a schematic illustration of the spectrum with frequency shift (cross-hatched)
Figure 5:
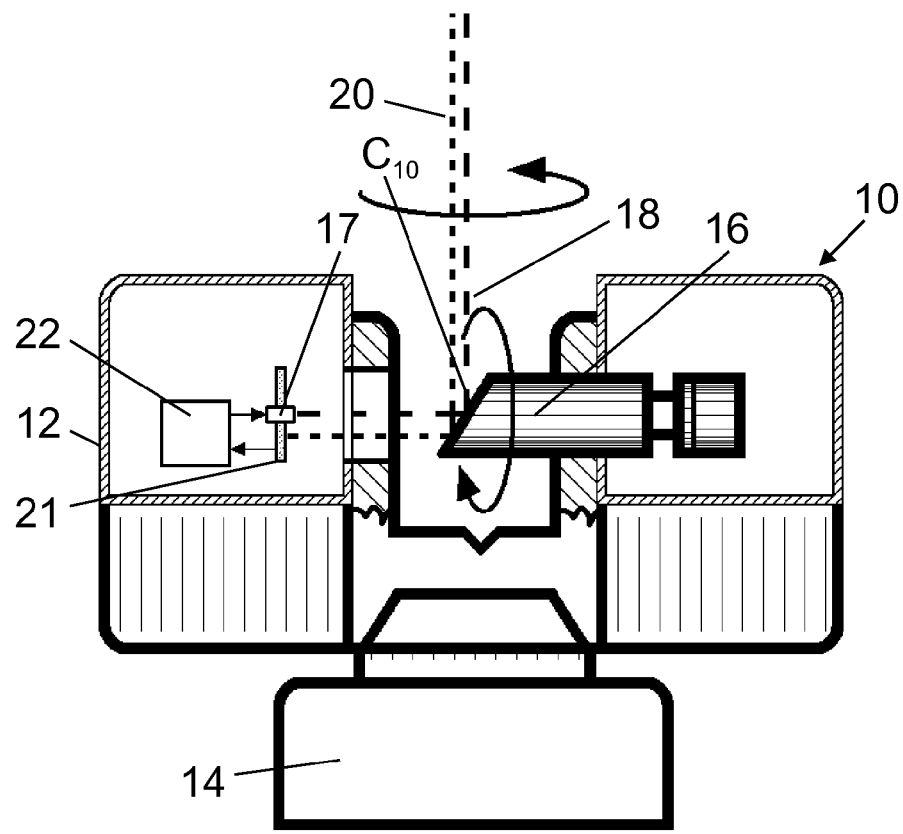
FIG. 5 is a side view, partially cut-away, of the laser scanner of FIG. 1.

Referring to FIGS. 1 and 5, a laser scanner 10 is provided as a device for optically scanning and measuring the surroundings of the laser scanner 10. The laser scanner 10 has a measuring head 12 and a base 14. The measuring head 12 is mounted on the base 14 as a unit that can be rotated about a vertical axis. The measuring head 12 has a mirror 16 that can be rotated about a horizontal axis. The point of intersection between the two axes of rotation is designated as the center $C_{10}$ of the laser scanner 10.

The measuring head 12 furthermore has a light emitter 17 for emitting an emission light beam 18. The emission light beam 18 may be a laser beam in the visible range of wavelength of approximately 300 to 1000 nm, for example 790 nm, but other electromagnetic waves having, for example, a greater wavelength can also be used, in principle. The emission light beam 18 is amplitude-modulated with, for example, a sinusoidal or rectangular, modulation signal. The emission light beam 18 is passed from the light emitter 17 onto the mirror 16, where it is deflected and emitted into the surroundings. A reception light beam 20 that is reflected or otherwise scattered in some way from an object O in the surroundings is captured again by the mirror 16, deflected and passed onto a light receiver 21. The direction of the emission light beam 18 and of the reception light beam 20 results from the angular positions of the mirror 16 and of the measuring head 12, which depend on the positions of their respective rotary drives, which are in turn detected by respective encoders. A control and evaluation device 22 has a data link connection to the light emitter 17 and the light receiver 21 in the measuring head 12, parts thereof also being arranged outside the measuring head 12, for example as a computer connected to the base 14. The control and evaluation device 22 is designed to determine, for a multiplicity of measuring points X, the distance d of the laser scanner 10 from the (illuminated point on the) object O from the propagation time of the emission light beam 18 and of the reception light beam 20. For this purpose, the phase shift between the two light beams 18, 20 is determined and evaluated.

By means of the relatively rapid rotation of the mirror 16, scanning is effected along a circular line. By means of the relatively slow rotation of the measuring head 12 relative to the base 14, the entire space is gradually scanned with the circular lines. The totality of the measuring points X of such a measurement shall be designated as a scan. The center $C_{10}$ of the laser scanner 10 defines for such a scan the stationary reference system of the laser scanner 10, in which the base 14 is stationary. Further details of the laser scanner 10, in particular of the construction of the measuring head 12, are described for example in U.S. Pat. No. 7,430,068 and DE 20 2006 005 643, the contents of which are incorporated by reference.

On account of the propagation time between laser scanner 10 and the object O and back, a shifted phase angle $\Phi$ results between emission light beam 18 and reception light beam 20, the phase angle $\Phi$ being determined from the time signal (i.e., the signal of the light receiver 21 over time t). In digitally resolved manner, the time signal comprises individual samples, of which in each case approximately 2000 are associated with a measuring period and are later integrated, with data reduction, to form a measuring point X, for example by moment formation or other types of integration. The time intervals which are assigned to the individual samples and which together produce the measuring period define the measuring clock $f_M$, that is, the frequency at which the samples are generated. The measuring clock $f_M$ is synchronized with a target frequency $\omega_0$, which corresponds to the modulation frequency of the emission light beam 18, in such a way that measurement is effected periodically at the same phase angles $\Phi$, for example 25 times per $2\pi$.

If the object O has a surface with respect to the surface normal of which the emission light beam 18 runs virtually perpendicularly, that is an angle of incidence α=90° is present, a specific measuring error becomes apparent. A distance difference Δd exists between spatially (and temporally) adjacent samples. The distance difference Δd corresponds to an "additional" phase shift ΔΦ when considering the differences in the phase angles Φ of the emission light beam 18 and of the reception light beam 20. The phase shift ΔΦ can become relatively large depending on the phase angle Φ (larger than the measuring accuracy). From the point of view of the laser scanner 10, the distance difference Δd of two temporally adjacent samples acts like a virtual movement of the object O. The measuring clock $f_M$ no longer matches the target frequency $\omega_0$ (that is to say that measurement is no longer carried out at the same phase angle), rather the reception light beam 20 appears to have a modulation frequency that is shifted by a frequency shift Δω relative to the target frequency $\omega_0$. The frequency shift Δω corresponds to the frequency shift in the case of the Doppler effect in the case of actually moving objects. This shift dependent on the phase angle Φ can also be interpreted as a distortion of the time domain or frequency domain.

In order to correct this measuring error, a virtual speed v is determined for this virtual movement of the object O. This virtual speed v is proportional to the frequency shift Δω. The phase angles Φ and thus the distances d are corrected by means of the virtual speed v with the result that the phase shift ΔΦ is eliminated from the samples and thus from the measuring points X. The determination of the virtual speed v and the correction of the phase shift ΔΦ are effected iteratively. The procedure begins with the zeroth approximation $v=\Delta d \cdot f_M$. As the distances d between every sampled point on the object O and the center $C_{10}$ may be calculated from the phase angles Φ, Δd is the difference of the distances d of the two temporally adjacent samples, which are also spatially adjacent due to the rotation of the mirror 16. This zeroth approximation of the virtual speed v is used to determine an approximated phase shift ΔΦ in each case for the samples. By means of the phase shift ΔΦ, the distances d respectively assigned to the samples are corrected for each sample. Then, a corrected distance difference Δd between two spatially and temporally adjacent samples is determined from the corrected distances d. From the corrected distance differences Δd, the virtual speed v is determined to the next approximation. The method converges, when the relative corrections, e.g., the corrections of the distance differences Δd compared to the absolute distance differences Δd, go below a predefined limit.

Figure 4:
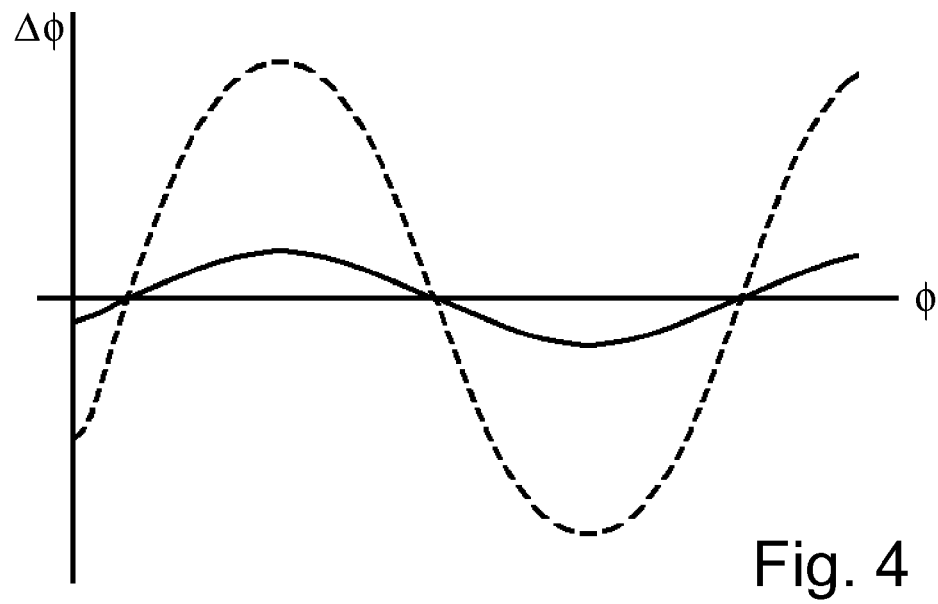
FIG. 4 shows the phase shift dependent on the phase angle before the correction (dashed line) and afterwards (solid line)

If the method converges and the virtual speed v is known, the phase shift ΔΦ (that is, the distortion of the time domain or frequency domain) is theoretically completely, in practice substantially, corrected. FIG. 4 shows the phase shift ΔΦ before the correction (dashed line) and afterwards (solid line). The correction of the phase shift ΔΦ leads to a correction of the time signal and ultimately, after the integration of the samples, to a correction of the measuring points X. The time signal can be used in its entirety, that is, not only with respect to single phase angles Φ (for example the zero crossings), wherein full signal quality is available.

The correction of the phase shift ΔΦ and thus the correction of the distances d is effected in a correction device, which may be integrated into the control and evaluation device 22.

The invention claimed is:

1. A method for optically scanning and measuring an object by a laser scanner, comprising the steps of:
    modulating an emission light beam with a target frequency;
    emitting the emission light beam;
    receiving a reception light beam reflected or otherwise scattered from the object in surroundings of the laser scanner, with a measuring clock, as a multiplicity of samples by a light receiver;
    determining in each case at least a distance from the laser scanner to the object from phase angles of the multiplicity of samples for a plurality of measuring points by a control and evaluation device; and
    correcting a phase shift caused by a distance difference of temporal adjacent samples to correct the determined distances.

2. The method of claim 1, the step of correcting a phase shift further comprising determining a virtual speed of the object for correcting the phase shift.

3. The method of claim 2, wherein the speed is determined from the distance difference existing between the distances of two temporally adjacent samples and the measuring clock.

4. The method of claim 2, wherein an approximated phase shift is determined from the virtual speed.

5. The method of claim 4, wherein corrected distances of the samples are determined from the approximated phase shift.

6. The method of claim 1, wherein the correction of the phase shift is effected iteratively.

7. The method of claim 1, wherein the multiplicity of samples with corrected distances are combined with data reduction to form the plurality of measuring points.

* * * * *